US007975540B2

(12) United States Patent
Angell et al.

(10) Patent No.: US 7,975,540 B2
(45) Date of Patent: Jul. 12, 2011

(54) METHODS AND APPARATUS FOR TIRE TREAD MEASUREMENT

(75) Inventors: Robert C. Angell, West Greenwich, RI (US); John G. DePrimo, East Greenwich, RI (US); James H. Ferguson, East Greenwich, RI (US); Patrick A. Luvara, East Greenwich, RI (US)

(73) Assignee: Rite-Solutions, Inc., Pawcatuck, CT (US)

( * ) Notice: Subject to any disclaimer, the term of this patent is extended or adjusted under 35 U.S.C. 154(b) by 4 days.

(21) Appl. No.: 12/428,845

(22) Filed: Apr. 23, 2009

(65) Prior Publication Data

US 2009/0320581 A1    Dec. 31, 2009

Related U.S. Application Data

(60) Provisional application No. 61/047,488, filed on Apr. 24, 2008.

(51) Int. Cl.
*G01M 17/02* (2006.01)
(52) U.S. Cl. ........................................................ 73/146
(58) Field of Classification Search ........................ None
See application file for complete search history.

(56) References Cited

U.S. PATENT DOCUMENTS

| 5,987,978 | A | * | 11/1999 | Whitehead | 73/146 |
|---|---|---|---|---|---|
| 6,539,789 | B1 | * | 4/2003 | Kostka et al. | 73/146 |
| 6,768,551 | B2 | * | 7/2004 | Mian et al. | 356/446 |
| 6,789,416 | B1 | * | 9/2004 | Tracy et al. | 73/146 |
| 7,466,430 | B2 | * | 12/2008 | Braghiroli | 356/607 |
| 7,578,180 | B2 | * | 8/2009 | Lionetti et al. | 73/146 |
| 2005/0052657 | A1 | * | 3/2005 | Braghiroli | 356/602 |
| 2005/0268707 | A1 | * | 12/2005 | Dale et al. | 73/146 |
| 2008/0011074 | A1 | * | 1/2008 | Braghiroli | 73/146 |
| 2008/0256815 | A1 | * | 10/2008 | Schafer | 33/739 |
| 2009/0000370 | A1 | * | 1/2009 | Lionetti et al. | 73/146 |
| 2010/0180676 | A1 | * | 7/2010 | Braghiroli et al. | 73/146 |

OTHER PUBLICATIONS

"Hand Held Scanner: 3D Laser Scanner Mounted on a Portable CMM," Nvision, Inc. The Art of Technology, http://www.nvision3d.com/products/handheld.htm downloaded Apr. 23, 2008.
"Perceptron: The Focus Process, Digital Tricam," www.perceptron.com, Apr. 23, 2008.

* cited by examiner

*Primary Examiner* — Andre J Allen
(74) *Attorney, Agent, or Firm* — Ryan, Mason & Lewis, LLP

(57) ABSTRACT

Methods and apparatus are provided for evaluating tread depth on at least one tire. One or more laser scanners are positioned at an offset position from a tire path of the at least one tire. A profile of the at least one tire is obtained and the tread depth is determined from the profile. Additional information, such as identifying information and mileage information, can optionally be obtained from the at least one tire.

19 Claims, 4 Drawing Sheets

METHODS AND APPARATUS FOR TIRE TREAD MEASUREMENT

CROSS-REFERENCE TO RELATED APPLICATIONS

The present application claims the benefit of U.S. Provisional Patent Application Ser. No. 61/047,488, filed Apr. 24, 2008, incorporated by reference herein.

FIELD OF THE INVENTION

The present invention relates to techniques for the measurement of tire treads and more particularly, to techniques for the measurement of tire treads using one or more lasers.

BACKGROUND OF THE INVENTION

Vehicle tires suffer wear and must be monitored for tread depth so that they can be changed when wear exceeds specified standards. While this may seem like a simple process (e.g., walking to each tire and measure the depth with a depth gauge), this manual process is imprecise, prone to errors, and relies completely on the diligence of the measurement taker. Additionally, checking and recording information for 18 tires on a typical tractor-trailer can take a significant amount of time. This is particularly true if this monitoring is desired by a large fleet (such as FedEx or UPS) each day as the fleet leaves the distribution point.

A number of techniques have been proposed or suggested for the measurement of tire tread depth. Laser scanners than can capture a profile of an object are well known in the scanning industry. These scanners can quickly capture a profile of an object such as a tire and therefore provide information about tread depth. Existing systems, however, required the tire to be scanned face on and therefore required the scanner to be placed either directly under the tire or to be moved into the path of the tire to take the measurement and then moved out of the path as the tire moves forward. Such designs therefore required significant moving parts, an operator (or robot) to move the scanner or required the scanner to be ruggedized to allow the tires to roll over the scanner without damaging the sensor or any materials that the scanner had to see through to perform its scan.

A need exists for improved methods and systems for evaluating tread depth, such as evaluating all 18 tires on a slowly moving tractor trailer. A further need exists for improved methods and systems for evaluating tread depth that reliably gather the information without manual intervention by the driver or an operator and enter this information into a database for current and future use. Yet another need exists for improved methods and systems for evaluating tread depth that are sufficiently rugged to be able to function in the real world (at truck stops and fleet distribution yards) in the harsh environment found in the trucking industry.

SUMMARY OF THE INVENTION

Generally, methods and apparatus are provided for automated tire tread measurement. According to one aspect of the invention, methods and apparatus are provided for evaluating tread depth on at least one tire. One or more laser scanners are positioned at an offset position from a tire path of the at least one tire. A profile of the at least one tire is obtained and the tread depth is determined from the profile. Additional information, such as identifying information and mileage information, can optionally be obtained from the at least one tire.

The laser scanners are preferably in a non-contact position relative to the at least one tire. The tread depth is obtained, for example, by measuring the difference between a minimum and maximum height of the tread, as indicated in the profile provided by the laser scanner.

A more complete understanding of the present invention, as well as further features and advantages of the present invention, will be obtained by reference to the following detailed description and drawings.

DETAILED DESCRIPTION

Detailed embodiments of the present invention are disclosed herein, however, it is to be understood that the disclosed embodiments are merely exemplary of the invention, which may be embodied in various forms. Therefore, specific functional or structural details or exemplary dimensions or angles disclosed herein are not to be interpreted as limiting, but merely as a basis for the claims and as a representative basis for teaching one skilled in the art to variously employ the present invention in virtually any appropriately detailed embodiment.

Figure 1:
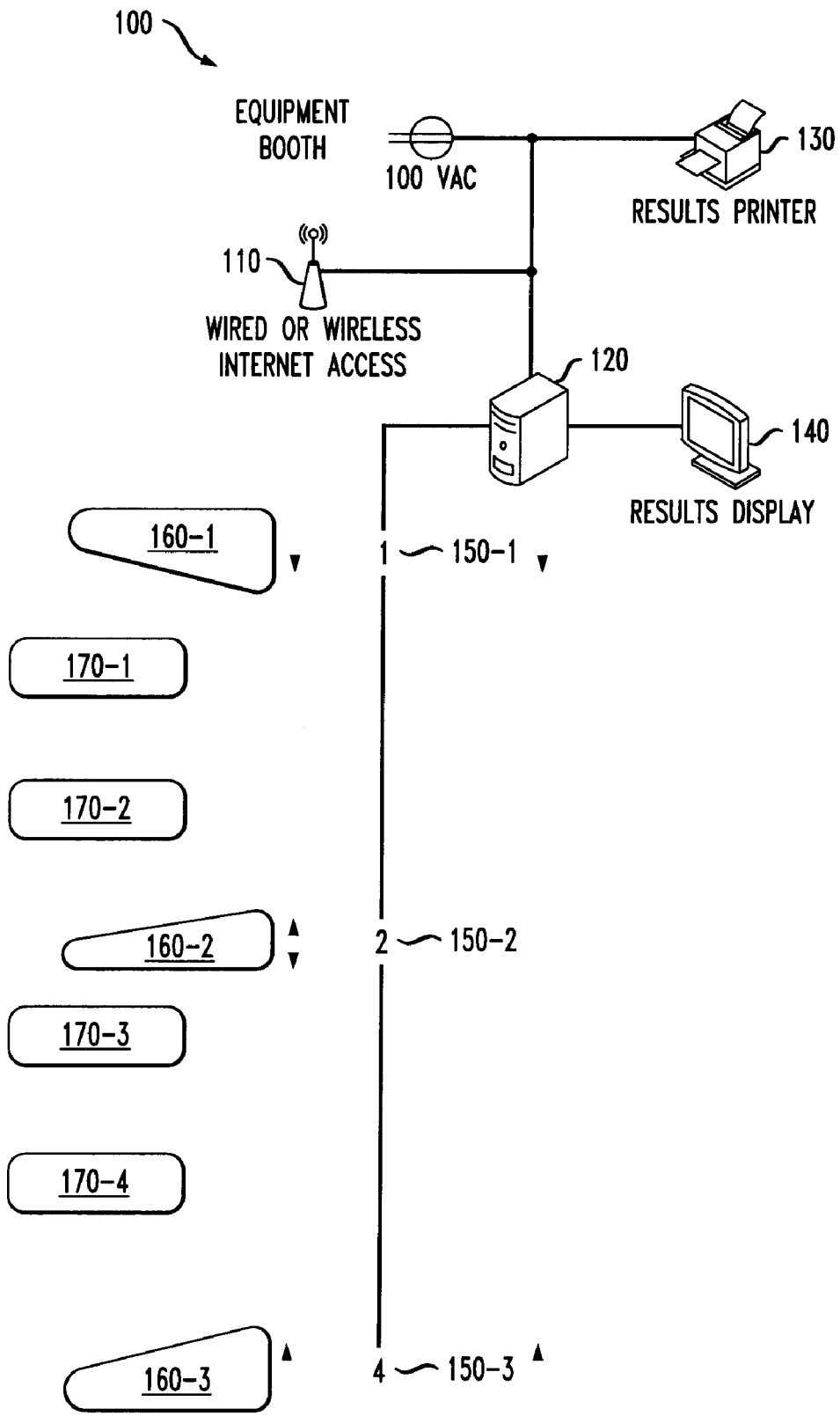
FIG. 1 is a schematic block diagram illustrating an exemplary implementation of the integrated tire sensor system that incorporates features of the present invention.

The present invention provides an integrated tire sensor system (ITSS) 100 that employs one or more laser scanners that are offset from the tire path (see FIG. 2) so that the tires 170-1 through 170-4 being scanned do not pass over the laser scanners 150. FIG. 1 is a schematic block diagram illustrating an exemplary implementation of the integrated tire sensor system 100 that incorporates features of the present invention. As shown in FIG. 1, the exemplary integrated tire sensor system 100 comprises an optional wired or wireless Internet connection 110, a computer system 120, an optional printer 130 and an optional display 140. As discussed further below in conjunction with FIG. 4, the computer system 120 executes a tread depth measurement process 400 that incorporates features of the present invention to translate a tire profile from the laser scanners 150 to actual tread depth measurements.

As shown in FIG. 1, the tires 170-1 through 170-4 are illustrated for an exemplary dual wheel geometry (having four wheels per axle). The exemplary integrated tire sensor system 100 includes three laser turrets 150-1 through 150-3, each comprising one or more laser scanners. As discussed further below in conjunction with FIG. 2, in the exemplary implementation, the side turrets 150-1 and 150-3 each comprise a single laser scanner, and the center turret 150-2 comprises two scanners. The exemplary integrated tire sensor system 100 optionally includes curbing 160-1 through 160-3 to ensure proper alignment of the vehicle and tires 170 with the laser scanners 150.

In one exemplary implementation, the laser turrets 150-1 through 150-3, each also contains an RFID Reader (not shown) to read embedded RFIDs in tires. For a discussion of one tire RFID system, see U.S. Pat. No. 7,050,017, incorporated by reference herein. In further variations, optical character recognition (OCR) techniques can be employed to read hub mounted odometers. Power and data to and from the turrets 150-1 through 150-3 can optionally be supplied through one or more reinforced conduits suitable for drive-over, as would be apparent to a person of ordinary skill in the art.

Figure 2:
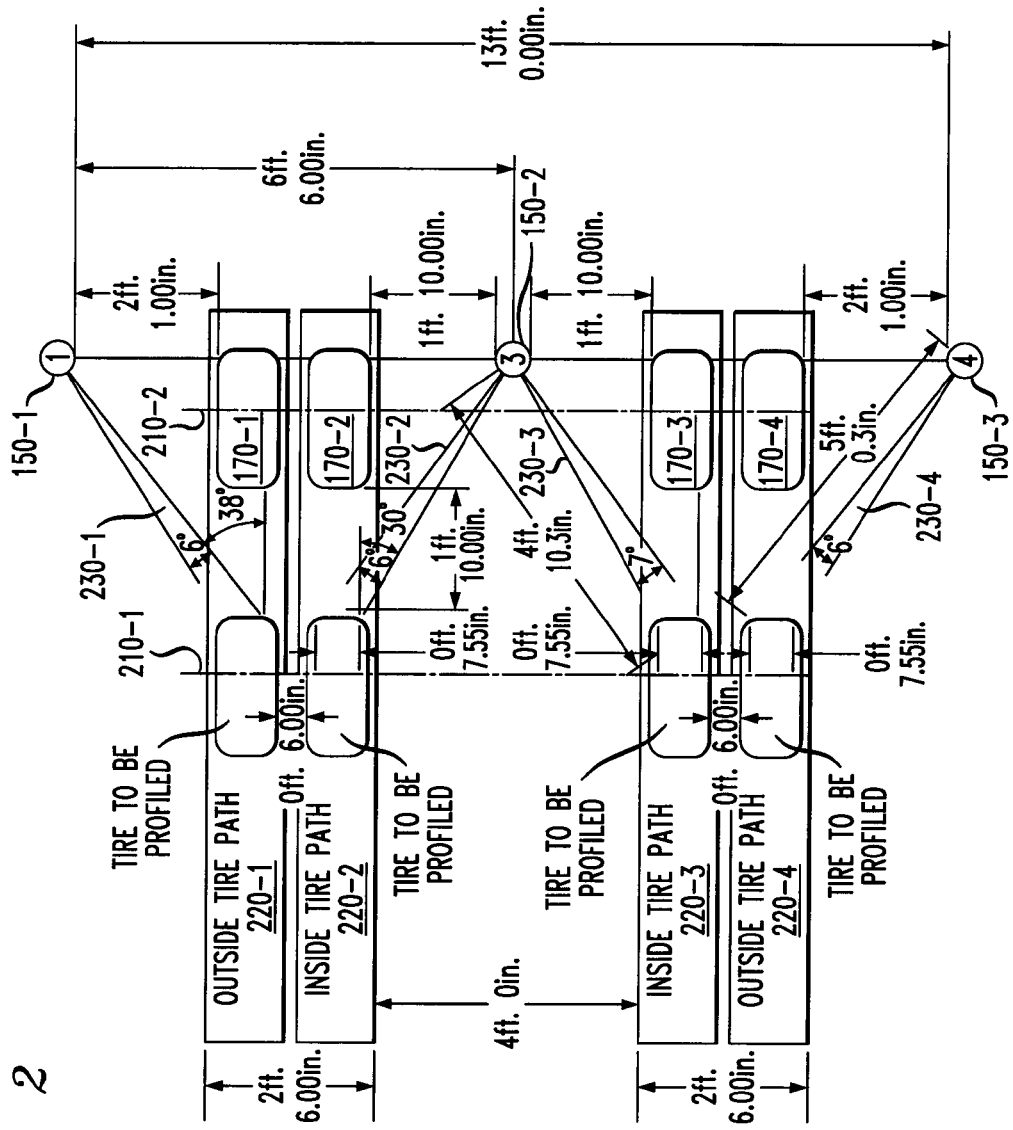
FIG. 2 illustrates the integrated tire sensor system of FIG. 1 in further detail.

FIG. 2 illustrates the integrated tire sensor system 100 of FIG. 1 in further detail. It is again noted that the exemplary dimensions and angles disclosed herein are not to be interpreted as limiting, but merely as a representative basis for teaching one skilled in the art. As shown in FIG. 2, the side turrets 150-1 and 150-3 each comprise a single laser scanner in an offset position from the outside tire paths 220-1 and 220-4, respectively, and the center turret 150-2 comprises two scanners in an offset position from the inside tire paths 220-2 and 220-3 and each focused on a respective inner tire 170-2 and 170-3 to be profiled. Generally, a laser beam 230-1 through 230-4 is formed into a plane of laser light, in a known manner. The laser plane intersects the respective tire 170, and a laser line forms along the contour of the tire. The laser line is reflected back to an image sensor, where it is transformed into a measurable digital image. The measured digital image provides a profile of the surface of the respective tire 170-1 through 170-4.

In the exemplary embodiment, it is assumed that four inches off the ground, there is approximately 22 inches between the back of the tire on the front axle and the front of the corresponding tire on the second axle. It has been found that with a 0.4" tread width and a 21° angle of attack, the laser sees close to the bottom of a 1" tread. The lasers beams are approximately 6° wide, profiling a 7.5" face at an angle of attack of between 52° and 60° (at a distance of approximately 5 feet).

The laser scanners 150 can be embodied, for example, using fixed scanners similar to the hand held scanners commercially available from NVision, Inc. (http://www.nvision3d.com), or the three dimensional scanning systems and non-contact measurement products, such as Digital Tricam®, commercially available from Perceptron Inc. (http://www.perceptron.com).

Figure 3:
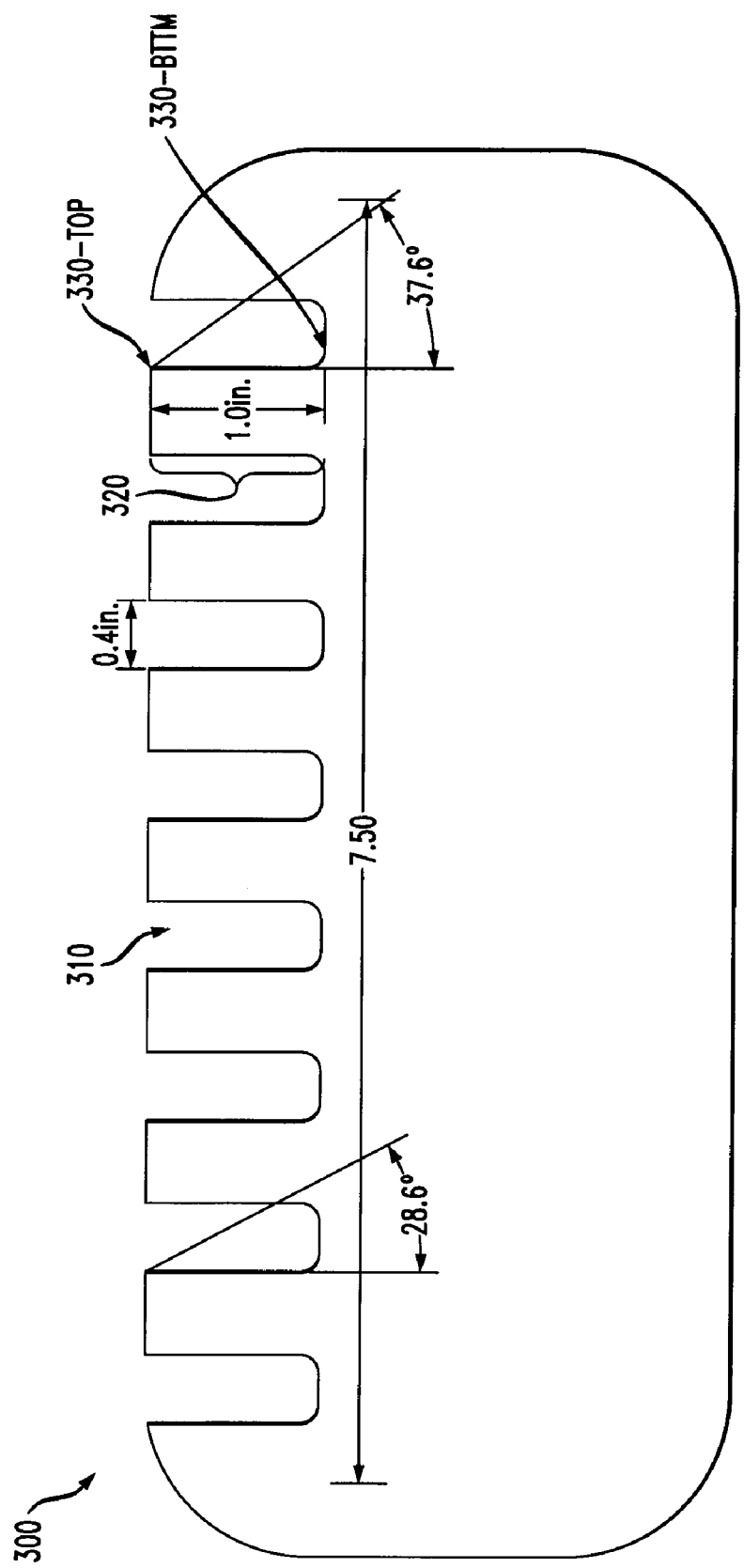
FIG. 3 illustrates an exemplary tire and tire tread in further detail.

FIG. 3 illustrates an exemplary tire 300 and tire tread 310 in further detail. As indicated above and shown in FIG. 3, the exemplary embodiment of the present invention profiles a 7.5" face of the tire 300. The exemplary tire 300 has a 0.4" width of the tread 310. For an exemplary 28.6° angle of attack, the laser sees close to the bottom of a 1" tread. Thus, the difference between the bottom 330-bttm and top 330-top of a given tread 310 is approximately 1".

Figure 4:
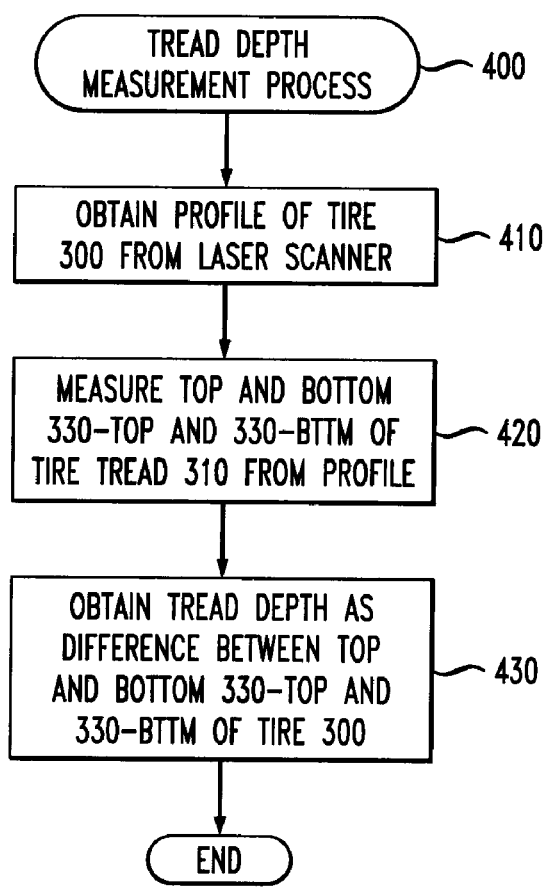
FIG. 4 is a flow chart of an exemplary tread depth measurement process that incorporates features of the present invention to translate a tire profile from the laser scanners to actual tread depth measurements.

FIG. 4 is a flow chart of an exemplary tread depth measurement process 400 that incorporates features of the present invention to translate a tire profile from the laser scanners to actual tread depth measurements. As shown in FIG. 4, the tread depth measurement process 400 initially obtains a profile of the tire 300 being measured from the appropriate laser scanner 150 during step 410. Thereafter, the tread depth measurement process 400 measures the top and bottom 330-top and 330-bttm, respectively, of the tire tread 310 from the profile during step 420. Finally, the tread depth measurement process 400 obtains the tread depth as the difference between top and bottom 330-top and 330-bttm of the tire 300 during step 430. Thereafter, the measured tread depth can optionally be recorded in a database, and be applied against specified thresholds to determine if the measured tread depth is acceptable.

Thus, the present invention uses side scanning, laser profilers to produce highly accurate profiles of all the tires of a vehicle while keeping the sensors isolated from any contact or physical interaction with the tires or road debris. In this manner, the disclosed integrated tire sensor system is solid state without the need to move the sensors. In addition, the disclosed integrated tire sensor system operates on moving vehicles with little, if any, manual intervention. The use of state of art laser imaging technology ensures extremely rapid measurements (such as 30 per second) and high accuracy (<0.1 mm) in the exemplary embodiment. A tire rolling at 5 mph will be scanned approximately four times over the 12-inch of the tire circumference available view to the tire in a dual axle configuration. Generally, the laser sensors are constructed balancing standoff distance, field of view, and angle of measurement. As the system will scan up to four tires per axle as the tires move past a stationary point of the scanner, the actual number of tires that can be scanned is not limited.

In addition, side scanning (as opposed to conventional bottom scanning techniques) allows more than just the small footprint area intersecting with the road to be scanned. In this manner, more samples across the tire surface are provided to determine the average tread depth still available on the tire.

Additional capabilities such as tread wear predication calculations, inventory management and other features can be provided, as would be apparent to a person of ordinary skill in the art.

Among other benefits, the exemplary embodiment of the invention is a solid state design requiring no moving parts and no operator or robotic movement to scan the tires of a typical tractor-trailer while it is moving past the fixed point of the system 100 at a typical slow speed of 5 MPH. Additional scanning technology can optionally be included in the system 100, such as RFID scanners to read embedded RFIDs in tires and an OCR to read axle mounted odometers and record mileage to predict tire life. The system could also allow manual entry of vehicle mileage if OCR readable odometers are not present.

Overall, the disclosed system is robust and does not require significant maintenance. Also, the disclosed system does not require significant or highly accurate alignment procedures since it does not have to move around or up to tires. The lack of moving parts also means that the disclosed system can be produced at a lower cost than one with robotic or other mechanical components.

While the invention has been described with reference to illustrative embodiments, dimensions and angles, it will be understood by those skilled in the art that various other changes, omissions and/or additions may be made and substantial equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

While a number of the figures herein show an exemplary sequence of steps, it is also an embodiment of the present invention that the sequence may be varied. Various permutations of the algorithm are contemplated as alternate embodiments of the invention. While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method for evaluating tread depth on at least one tire, comprising:

positioning one or more laser scanners at an offset position from a tire path of said at least one tire;
obtaining a profile of said at least one tire; and
determining said tread depth from said profile.

2. The method of claim 1, further comprising the step of obtaining identifying information from said at least one tire.

3. The method of claim 2, wherein said identifying information is obtained from an RFID tag associated with said at least one tire.

4. The method of claim 1, further comprising the step of obtaining mileage information from said at least one tire.

5. The method of claim 4, wherein said mileage information is obtained by reading an odometer.

6. The method of claim 1, wherein said laser scanners are in a non-contact position relative to said at least one tire.

7. The method of claim 1, wherein said determining step further comprises the step of obtaining a difference between a minimum and maximum height of said tread.

8. An integrated tire sensor system for evaluating tread depth on at least one tire, comprising:

one or more laser scanners positioned at an offset position from a tire path of said at least one tire;
a memory; and
at least one processor, coupled to the memory, operative to:
obtain a profile of said at least one tire; and
determine said tread depth from said profile.

9. The integrated tire sensor system of claim 8, wherein said processor is further configured to obtain identifying information from said at least one tire.

10. The integrated tire sensor system of claim 8, wherein said identifying information is obtained from an RFID tag associated with said at least one tire.

11. The integrated tire sensor system of claim 8, wherein said processor is further configured to obtain mileage information from said at least one tire.

12. The integrated tire sensor system of claim 11, wherein said mileage information is obtained by reading an odometer.

13. The integrated tire sensor system of claim 8, wherein said laser scanners are in a non-contact position relative to said at least one tire.

14. The integrated tire sensor system of claim 8, wherein said processor is further configured to obtain a difference between a minimum and maximum height of said tread.

15. The integrated tire sensor system of claim 8, wherein said at least one tire is a truck tire.

16. An article of manufacture for evaluating tread depth on at least one tire, comprising a machine readable storage medium containing one or more programs which when executed implement the steps of:

positioning one or more laser scanners at an offset position from a tire path of said at least one tire;
obtaining a profile of said at least one tire; and
determining said tread depth from said profile.

17. The article of manufacture of claim 16, further comprising the step of obtaining identifying information from said at least one tire.

18. The article of manufacture of claim 16, further comprising the step of obtaining mileage information from said at least one tire.

19. The article of manufacture of claim 16, wherein said determining step further comprises the step of obtaining a difference between a minimum and maximum height of said tread.

* * * * *